United States Patent
Itoh et al.

(10) Patent No.: US 9,916,516 B2
(45) Date of Patent: Mar. 13, 2018

(54) IMAGE PROCESSING APPARATUS, IMAGE PROCESSING METHOD, AND NON-TRANSITORY STORAGE MEDIUM FOR CORRECTING AN IMAGE BASED ON COLOR AND SCATTERED LIGHT INFORMATION

(71) Applicant: CANON KABUSHIKI KAISHA, Tokyo (JP)

(72) Inventors: Yasuhiro Itoh, Yokohama (JP); Hisato Sekine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/552,444

(22) Filed: Nov. 24, 2014

(65) Prior Publication Data

US 2015/0146980 A1 May 28, 2015

(30) Foreign Application Priority Data

Nov. 27, 2013 (JP) ................ 2013-245199

(51) Int. Cl.
*G06K 9/46* (2006.01)
*G06K 9/00* (2006.01)
*G06T 5/00* (2006.01)

(52) U.S. Cl.
CPC ....... *G06K 9/4652* (2013.01); *G06K 9/00771* (2013.01); *G06K 9/4661* (2013.01);
(Continued)

(58) Field of Classification Search
None
See application file for complete search history.

(56) References Cited

U.S. PATENT DOCUMENTS 8,340,461 B2 12/2012 Sun et al.
2012/0213436 A1* 8/2012 Grindstaff ............... G06T 5/008
382/167
(Continued)

FOREIGN PATENT DOCUMENTS

JP 2008-527766 A 7/2008
JP 2013-058202 A 3/2013

OTHER PUBLICATIONS http://www.siggraph.org/education/materials/HyperGraph/gamma_correction/palette.html, Getting More Than 16.7 Million Colors Through Gamma Adjustments, 2012.*
(Continued)

*Primary Examiner* — Sumati Lefkowitz
*Assistant Examiner* — Jiangeng Sun
(74) *Attorney, Agent, or Firm* — Canon USA, Inc. I.P. Division

(57) ABSTRACT

At least one image processing apparatus, and at least one method, of the present invention(s) generate a corrected image obtained by removing, from a color image whose pixel values contain components derived from scattered light, at least part of the components derived from the scattered light. The at least one image processing apparatus includes a generation unit configured to generate the corrected image by correcting a pixel value of a first color component of each pixel in the color image by using a first reference intensity and a weight value, and by correcting a pixel value of a second color component of each pixel in the color image by using a second reference intensity and a weight value.

33 Claims, 13 Drawing Sheets

(52) U.S. Cl.
CPC .............. *G06T 5/003* (2013.01); *G06T 5/007* (2013.01); *G06T 2207/10024* (2013.01); *G06T 2207/20012* (2013.01)

(56) References Cited

U.S. PATENT DOCUMENTS

2015/0071563 A1* 3/2015 Park .................... G06T 5/007
 382/274
2015/0304524 A1* 10/2015 Toda .................... G06T 5/001
 382/167

OTHER PUBLICATIONS

Tan Zhiming, et al., "Fast Single-Image Defogging", Sep. 2013, Fujitsu, vol. 64, No. 5, pp. 523-528 (English abstract included).

* cited by examiner

FIG. 4
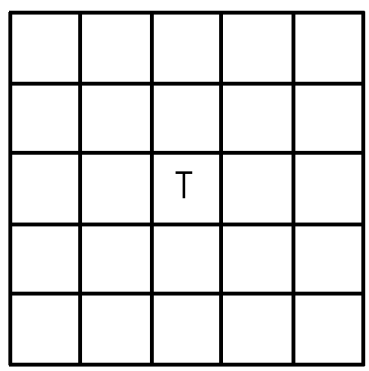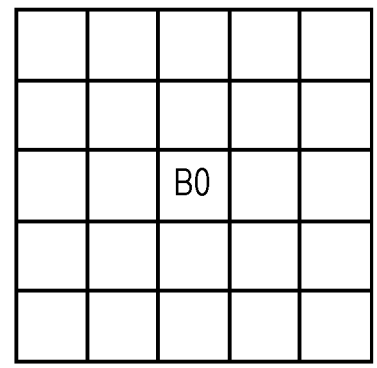
T = (R0, G0, B0)
R0 > G0 > B0

FIG. 7A

| R1 | G2 | R3 | G4 | R5 |
|---|---|---|---|---|
| R6 | R7 | B8 | R9 | B10 |
| R11 | B12 | G13 | R14 | G15 |
| G16 | R17 | R18 | G19 | B20 |
| B21 | R22 | G23 | R24 | R25 |

DARK CHANNEL IMAGE

FIG. 7B

| R1 | R2 | R3 | R4 | R5 |
|---|---|---|---|---|
| R6 | R7 | R8 | R9 | R10 |
| R11 | R12 | R13 | R14 | R15 |
| R16 | R17 | R18 | R19 | R20 |
| R21 | R22 | R23 | R24 | R25 |

R IMAGE

FIG. 7C

| G1 | G2 | G3 | G4 | G5 |
|---|---|---|---|---|
| G6 | G7 | G8 | G9 | G10 |
| G11 | G12 | G13 | G14 | G15 |
| G16 | G17 | G18 | G19 | G20 |
| G21 | G22 | G23 | G24 | G25 |

G IMAGE

FIG. 7D

| B1 | B2 | B3 | B4 | B5 |
|---|---|---|---|---|
| B6 | B7 | B8 | B9 | B10 |
| B11 | B12 | B13 | B14 | B15 |
| B16 | B17 | B18 | B19 | B20 |
| B21 | B22 | B23 | B24 | B25 |

B IMAGE

IMAGE PROCESSING APPARATUS, IMAGE PROCESSING METHOD, AND NON-TRANSITORY STORAGE MEDIUM FOR CORRECTING AN IMAGE BASED ON COLOR AND SCATTERED LIGHT INFORMATION

BACKGROUND OF THE INVENTION

Field of the Invention

The present invention(s) relate to image processing that reduces the influence of scattered light.

Description of the Related Art

In the field of surveillance cameras and the like, there is a problem in that visibility is reduced due to the influence of particles (for example, fog or mist) existing between a camera and an object, and the image quality of a captured image is degraded. A cause of this is that light is scattered by particle components when the light passes through the atmosphere. It is known that the light scattering in the atmosphere has two types. One is Mie scattering which is caused by particles, such as particles of dust, grit, and water vapor, whose particle diameters are larger than the wavelength of light. Because Mie scattering occurs regardless of the wavelength of light, when Mie scattering occurs, the further an object is from the camera, the more the contrast of the object is reduced, and the object appears white. The other is Rayleigh scattering which is caused by particles, such as air molecules, whose particle diameters are smaller than the wavelength of light. Because, in Rayleigh scattering, the shorter the wavelength of light is, the more strongly the light is scattered, most scattered light that reaches eyes has a blue component, and thus the further an object is, the more the entire object appears blue.

As a technique in which an image whose visibility has been reduced due to scattering is corrected, a technique disclosed in U.S. Pat. No. 8,340,461 has been suggested. In the technique disclosed in U.S. Pat. No. 8,340,461, for each target pixel, contrast is corrected by using an image (dark channel image) obtained by extracting a minimum pixel value among pixel values of all red, green, and blue (RGB) channels in a predetermined region in the vicinity of the target pixel, thereby improving the visibility.

In the technique disclosed in U.S. Pat. No. 8,340,461, however, contrast is corrected without consideration of a difference between two light scattering characteristics of the above-mentioned Mie scattering and Rayleigh scattering, and blue light scattered due to Rayleigh scattering in particular is therefore not corrected sufficiently. Hence, in an image corrected by using the technique disclosed in U.S. Pat. No. 8,340,461, for example, the further an object is, the more the blue tends to be enhanced.

SUMMARY OF THE INVENTION

In one or more of the present invention(s), in consideration of a difference between two scattering characteristics, respective scattering components are removed, and thus an image in which the influence of scattered light is more reduced is obtained.

An image processing apparatus according to one or more of the present invention(s) generates a corrected image obtained by removing, from a color image whose pixel values contain components derived from scattered light, at least part of the components derived from the scattered light. The image processing apparatus includes: an acquisition unit configured to acquire the color image; a derivation unit configured to derive, based on pixel values of a first color component of the color image, a first reference intensity corresponding to the first color component of the scattered light, and derive, based on pixel values of a second color component, which is different from the first color component, of the color image, a second reference intensity, which is different from the first reference intensity, corresponding to the second color component of the scattered light; a setting unit configured to set, for each pixel in the color image, weight values representing levels of influences of the scattered light; and a generation unit configured to generate the corrected image by correcting a pixel value of the first color component of each pixel in the color image by using the first reference intensity and a weight value, and by correcting a pixel value of the second color component of each pixel in the color image by using the second reference intensity and a weight value. In accordance with one or more of the present invention(s), an image processing apparatus may include: an acquisition unit configured to acquire image data representing a color image whose pixel values contain components derived from scattered light; and a correction unit configured to correct at least one pixel value of each pixel in the color image to reduce an influence of the scattered light in the color image, wherein the correction unit makes different corrections to respective different color components of the at least one pixel value of each pixel in the color image. According to other aspects of the present invention(s), method(s) of generating a corrected image and/or of correcting one or more pixels, and computer-readable storage medium(s) storing a program that causes a computer to execute one of the method(s), are discussed herein.

Further features of the present invention(s) will become apparent from the following description of exemplary embodiments with reference to the attached drawings.

BRIEF DESCRIPTION OF THE DRAWINGS

FIG. 4 illustrates a dark channel extraction process.

FIGS. 7A to 7D illustrate a reference pixel value extraction process.

DESCRIPTION OF THE EMBODIMENTS

First Embodiment

In a first embodiment, for each of R, G, and B channels, detection of scattered light is performed, and thus not only a reduction in contrast due to Mie scattering but also coloring due to Rayleigh scattering is corrected. The configuration of this embodiment will be described below.

Figure 1:
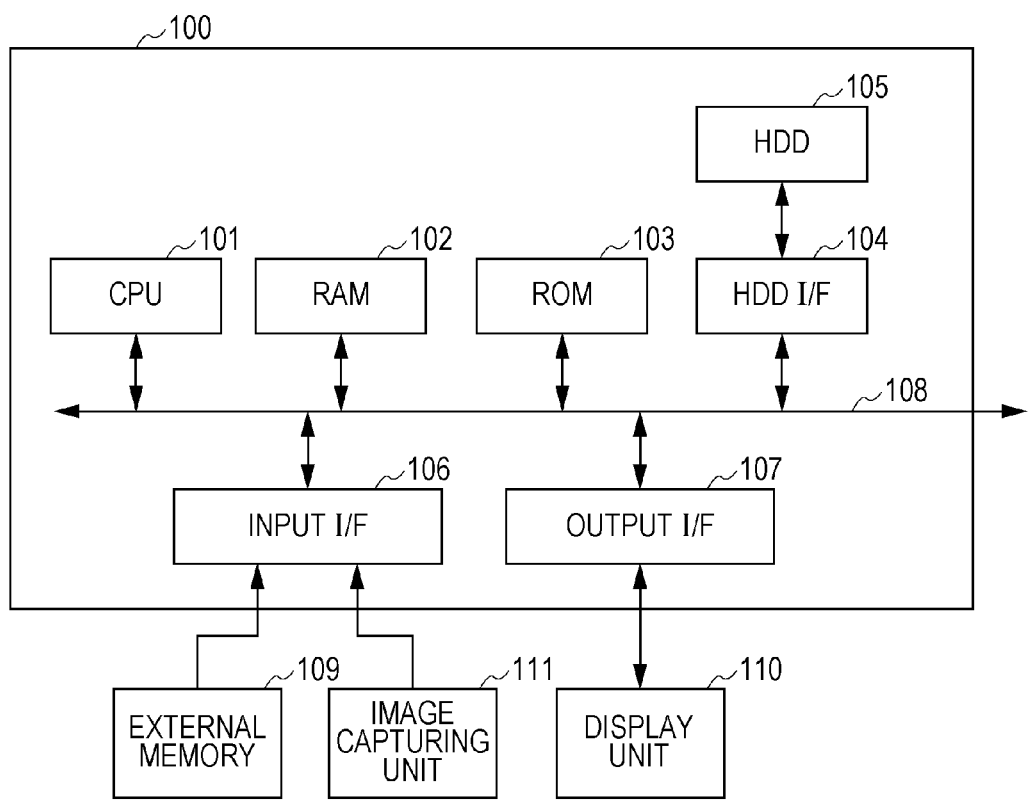
FIG. 1 illustrates the configuration of an image processing apparatus.

FIG. 1 is a block diagram illustrating the configuration of an image processing apparatus 100 according to this embodiment. The image processing apparatus 100 according to this embodiment includes a central processing unit (CPU) 101, a random access memory (RAM) 102, a read only memory (ROM) 103, a hard disk drive (HDD) interface (I/F) 104, an HDD 105, an input I/F 106, an output I/F 107, and a system bus 108. The CPU 101 is a processor that performs centralized control of components to be described below. The RAM 102 is a memory functioning as a main memory of the CPU 101 and a work area, and the ROM 103 is a memory storing a program for performing processes in the image processing apparatus 100.

The HDD I/F 104 is, for example, a serial advanced technology attachment (ATA)(SATA) interface, and connects the HDD 105 serving as a secondary storage device to the system bus 108. The CPU 101 is capable of reading data from the HDD 105 and writing data into the HDD 105 via the HDD I/F 104. Furthermore, the CPU 101 is capable of loading data stored in the HDD 105 into the RAM 102 and similarly storing data loaded in the RAM 102 into the HDD 105. The CPU 101 interprets data loaded in the RAM 102 as a program, and can execute it. In addition to the HDD 105, the secondary storage device may be a storage device, such as an optical disk drive.

The input I/F 106 is, for example, a Universal Serial Bus (USB) interface or IEEE 1394 serial bus interface.

The image processing apparatus 100 is connected to an external memory 109 and an image capturing unit 111 via the input I/F 106. The CPU 101 is capable of acquiring data from the external memory 109 and the image capturing unit 111 via the input I/F 106. The output I/F 107 is a video output interface, such as a digital visual interface (DVI) or a high-definition multimedia interface (HDMI) (registered trademark). The image processing apparatus 100 is connected to a display unit 110 via the output I/F 107. The CPU 101 is capable of outputting an image to the display unit 110 via the output I/F 107 and displaying the output image on the display unit 110.

The system bus 108 is a path for transfer of various pieces of data, and the components included in the image processing apparatus 100 are interconnected via the system bus 108.

The external memory 109 is a storage medium, such as a hard disk, a memory card, a CompactFlash (CF) card, a secure digital (SD) card, or a USB memory, and is capable of storing image data or the like processed by the image processing apparatus 100.

The display unit 110 is a display device, such as a display, and is capable of displaying an image or the like processed by the image processing apparatus 100.

The image capturing unit 111 is a camera that receives light information of an object with a sensor and outputs an acquired image as digital data. In this embodiment, the image capturing unit 111 performs imaging to thereby acquire image data in which contrast is reduced due to scattered light, and the image processing apparatus 100 performs processing on the image data to thereby generate an image in which the influence of the scattered light is reduced.

Scattered Light Removal Process

Figure 2:
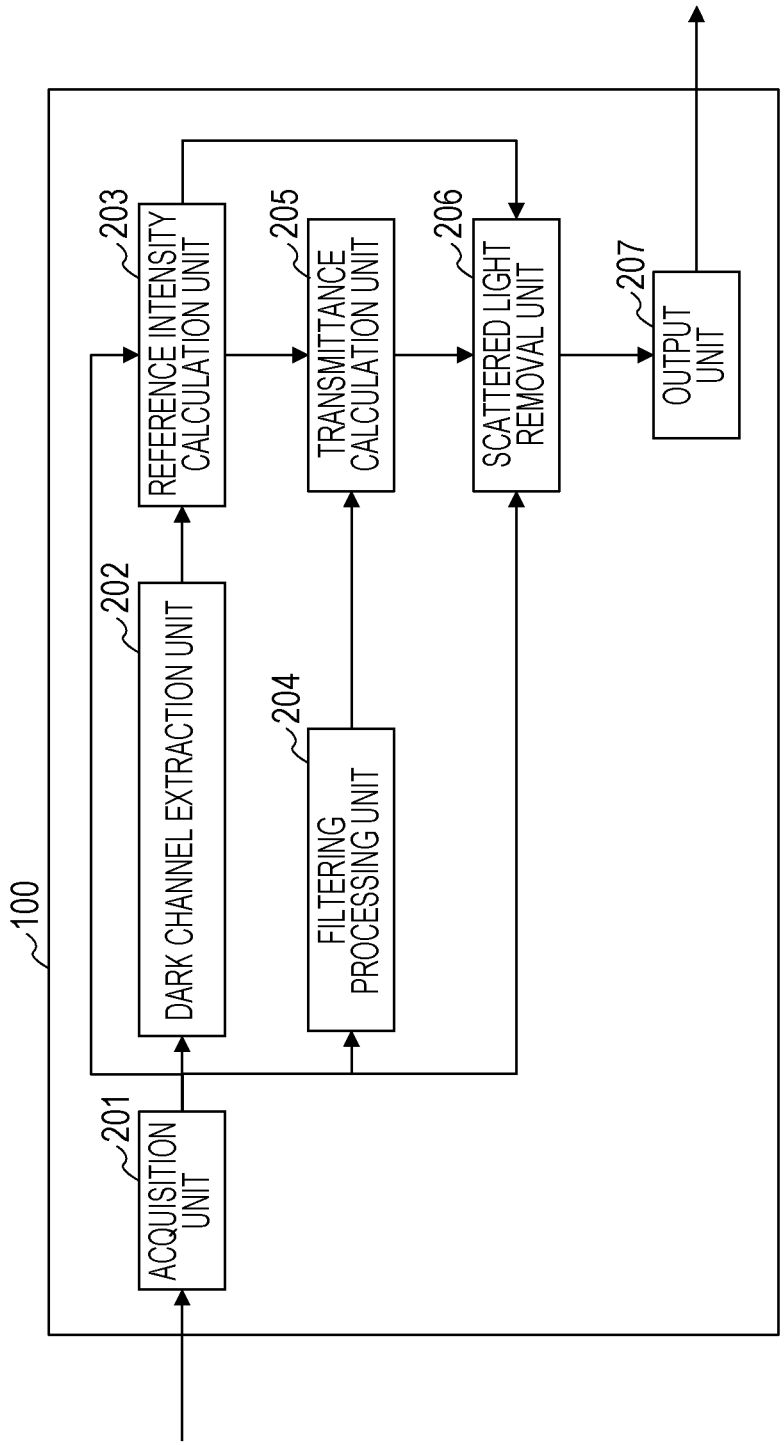
FIG. 2 illustrates the configuration of an image processing apparatus according to a first embodiment.
Figure 3:
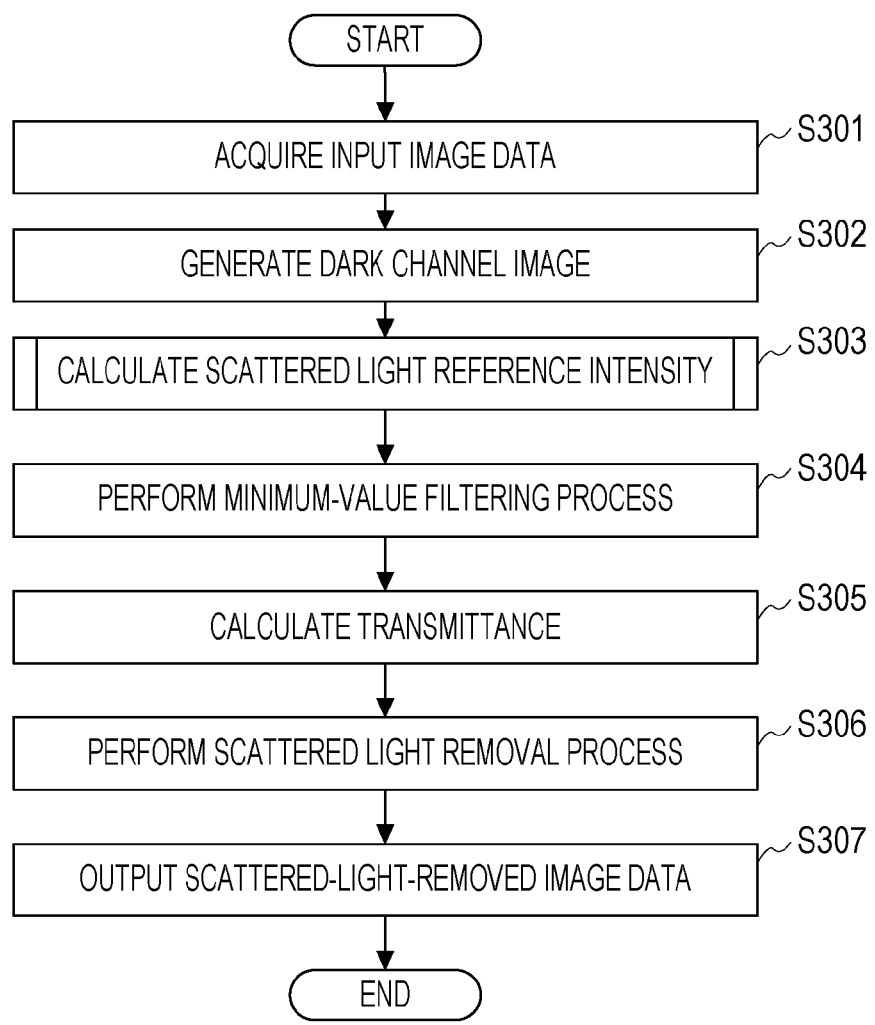
FIG. 3 is a flowchart illustrating the flow of a process performed in the image processing apparatus according to the first embodiment.
Figure 5A:
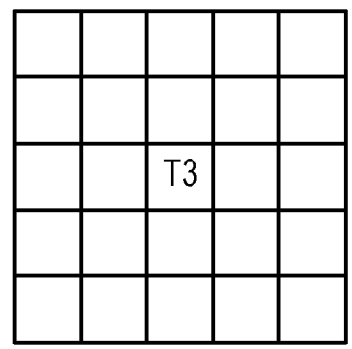
FIGS. 5A to 5D illustrate a minimum-value filtering process.
Figure 5B:
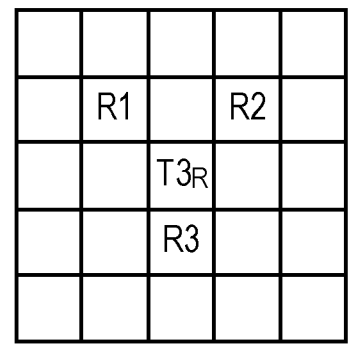
Figure 5C:
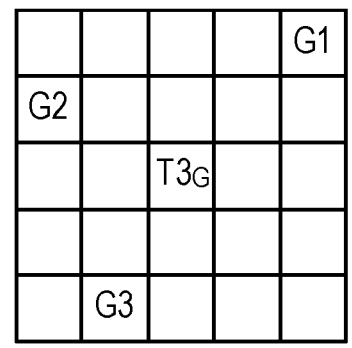
Figure 5D:
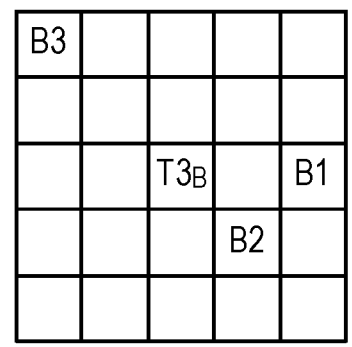

A process performed in the image processing apparatus according to this embodiment will be described below with reference to a block diagram illustrated in FIG. 2 and a flowchart illustrated in FIG. 3. FIG. 2 is a processing block diagram of the image processing apparatus 100. In this embodiment, the CPU 101 executes a program represented by the flowchart in FIG. 3 stored in the ROM 103 or the HDD 105 to thereby function as each block illustrated in FIG. 2. As a matter of course, the CPU 101 does not have to have functions of all the processing blocks, and processing circuits corresponding to the processing blocks may be newly provided in the image processing apparatus 100.

First, in step S301, an acquisition unit 201 acquires image data output from the image capturing unit 111. Hereinafter, this image data is referred to as input image data, and an image represented by the input image data is referred to as an input image. The acquisition unit 201 outputs the acquired input image data to a dark channel extraction unit 202, a reference intensity calculation unit 203, a filtering processing unit 204, and a scattered light removal unit 206.

In step S302, the dark channel extraction unit 202 extracts dark channels of the input image by using the input image data output from the acquisition unit 201. The dark channel extraction unit 202 outputs a dark channel image in which the extracted dark channels are arranged to the reference intensity calculation unit 203.

A dark channel is defined as a value of a component having a minimum pixel value among R, G, and B components of a pixel value contained in a certain pixel. Because, in comparison to an original image signal, a relatively large proportion of the component having the minimum pixel value among the R, G, and B components of the pixel value is made up of a component derived from scattered light, a dark channel image is an image that more strongly reflects intensities of components of the scattered light than a color image. FIG. 4 is a schematic diagram illustrating the process in which the dark channel extraction unit 202 derives a dark channel corresponding to a certain target pixel. As illustrated in a left image in FIG. 4, in a target pixel T in an input image, suppose now that a pixel value of T is (R0, G0, B0). At this time, suppose that an absolute value of the pixel value satisfies the relationship of R0>G0>B0, a dark channel of the target pixel T is B0. Hereinafter, this process is applied to all pixels, and a dark channel image is thereby generated.

In step S303, the reference intensity calculation unit 203 obtains a reference intensity of each color component of scattered light by using the dark channel image output from the dark channel extraction unit 202 and the input image data output from the acquisition unit 201. Here, a reference intensity is a reference value for determining the magnitude of a component of scattered light at each pixel position of image data, and is determined on the basis of pixel values of pixels for the sky or the like in which components of the scattered light are dominant and which is white and hazy due to fog, mist, or the like, as pixels best representing a color profile of the scattered light. This process will be described in detail later.

In step S304, the filtering processing unit 204 performs a minimum-value filtering process on each of an R image obtained by extracting only an R component of the input image, a G image obtained by extracting only a G component, and a B image obtained by extracting only a B component. Then, a minimum-value filtered image generated by performing the filtering process is output to a transmittance calculation unit 205.

A minimum-value filtering process applied to an image here will be described with reference to FIGS. 5A to 5D. An example of an R image will be described. In the R image, there are, as pixels whose pixel values are small, respective pixels having pixel values R1, R2, and R3 in a region of 5×5 pixels around a target pixel T3 having a pixel value $T3_R$. For example, suppose that the magnitude relationship between these pixel values is $R3>R2>T3_R>R1$, the pixel value $T3_R$ of the target pixel T3 to be subjected to the filtering process is replaced with R1 which is a minimum pixel value in a patch centered at the target pixel T3. This process is performed on each pixel in each of R, G, and B images, and a pixel value of each pixel is thereby replaced with a pixel value that most reflects a component of scattered light in a region around the pixel. Thus, a minimum-value filtered image $I_F(x, y, c)$ in which the influence of a local structure is reduced is obtained. $I_F(x, y, c)$ denotes a pixel value having been subjected to the minimum-value filtering process, at a pixel position (x, y) in a color plane c, and c=1 corresponds to R image, c=2 to G image, and c=3 to B image. This process reduces the possibility that a local structure or noise in an image is misidentified as that derived from scattered light.

In step S305, the transmittance calculation unit 205 determines, on the basis of the minimum-value filtered image output from the filtering processing unit 204 and the scattered light reference intensity output from the reference intensity calculation unit 203, a transmittance t(x, y, c) at each pixel position of the input image. The transmittance t(x, y, c) is defined by the following equation.

$$t(x, y, c) = 1.0 - \omega\left(\frac{I_F(x, y, c)}{A(c)}\right) \quad (1)$$

Here, A(c) is the reference intensity of the scattered light in the color plane c calculated in step S303. The symbol ω is a coefficient representing an assumed transmittance in a pixel used for calculation of the reference intensity of the scattered light, and a value of 0.9 is used in this embodiment. This value may be freely adjusted so that an image having been subjected to a scattered light removal process is a desirable image, and thus another value may be used. The transmittance calculation unit 205 determines a transmittance for each pixel by assigning acquired values to respective variables in Equation (1), and outputs the determined transmittance to the scattered light removal unit 206. A transmittance does not have to be determined on the basis of Equation (1), and may be determined on the basis of, for example, a distance acquired by using a stereo camera or the like.

In step S306, a scattered light removal process is performed on the input image by using the transmittance output from the transmittance calculation unit 205, the input image data output from the acquisition unit 201, and the reference intensity of the scattered light output from the reference intensity calculation unit 203. The scattered light removal process is defined by the following equation.

$$J(x, y, c) = \frac{(I(x, y, c) - A(c))}{\max(t_0, t(x, y, c))} + A(c) \quad (2)$$

Here, J(x, y, c) denotes a pixel value of an image having been subjected to the scattered light removal process, and I(x, y, c) denotes a pixel value of the input image. The symbol $t_0$ is a coefficient used for adjustment, and is, for example, 0.1 in this embodiment. If t(x, y, c) is closer and closer to 0, this is a value provided for preventing the value of J from significantly varying depending on a slight difference in the value of I, and a value other than the value of 0.1 may be freely set so that a more desirable image is obtained. The scattered light removal unit 206 assigns acquired values to respective parameters in Equation (2), obtains J for each pixel, and outputs it as a scattered-light-removed image to an output unit 207.

In step S307, the output unit 207 acquires the scattered-light-removed image output from the scattered light removal unit 206, outputs it to the HDD 105 via the HDD I/F 104, and ends the process.

Figure 6:
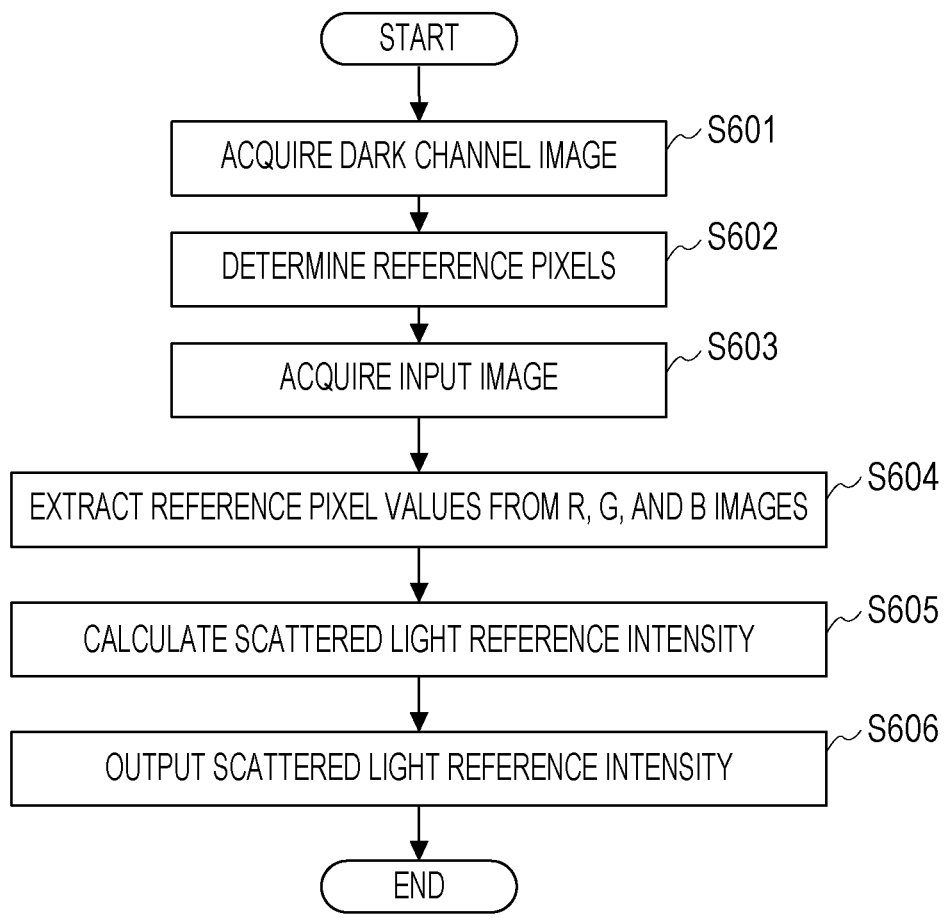
FIG. 6 is a flowchart illustrating the flow of a scattered light reference intensity calculation process.

The above is the flow of the process performed in the image processing apparatus 100 according to this embodiment. Next, a process of calculating a reference intensity of scattered light performed in step S303 will be described with reference to a flowchart illustrated in FIG. 6.

Reference Intensity Calculation Process

In step S601, the reference intensity calculation unit 203 acquires the dark channel image output from the dark channel extraction unit 202.

In step S602, the reference intensity calculation unit 203 determines, on the basis of the dark channel image acquired in step S601, a pixel used for reference intensity calculation. Here, the reference intensity calculation unit 203 refers to pixel values of pixels in the dark channel image, and selects a pixel whose pixel value is larger than or equal to a threshold as a reference pixel used for reference intensity calculation. In this embodiment, the top 1% of pixels whose pixel values are large among the pixels in the dark channel image are defined as reference pixels. Because the dark channel image is an image whose pixel values reflect intensities of scattered light, it may be considered that the pixels whose pixel values are large in the dark channel image are pixels in which components of the scattered light are dominant. A threshold used for determining a reference pixel is not limited to the above, or alternatively, may be freely set in accordance with a scene corresponding to an image.

In step S603, the reference intensity calculation unit 203 acquires the input image data output from the acquisition unit 201.

In step S604, the reference intensity calculation unit 203 extracts reference pixel values used for reference intensity calculation on the basis of the input image data acquired in step S603 and the reference pixels determined in step S602. A method of reference pixel value extraction will be described with reference to FIGS. 7A to 7D.

FIG. 7A illustrates an example of the dark channel image. Numbers 1 to 25 are assigned to pixels from top left to bottom right. As for each pixel in the dark channel image, a pixel value of a color component having a minimum pixel value among color components of a pixel value (Rk, Gk, Bk), where k=1 to 25, of each pixel in the input image is extracted and arranged. Pixels selected as reference pixels are circled. In this step, in the R image, G image, and B image of the input image data, pixel values of pixels corresponding to the reference pixels are extracted as reference pixel values. That is, because pixels 3, 12, 13, and 18 are selected as reference pixels in the dark channel image, as illustrated in FIGS. 7B to 7D, pixel values of pixels 3, 12, 13, and 18 in each of the R image, G image, and B image are extracted as reference pixel values. In this way, in this embodiment, pixel values of pixels in which the scattered light has been determined to be dominant are extracted for each color so as to calculate a reference intensity, and thus a reference intensity that reflects wavelength dependence of the scattered light may be calculated.

In step S605, the reference intensity calculation unit 203 calculates, on the basis of the reference pixel values extracted in step S604, a reference intensity A(c) of the scattered light for each of the color components of R, G, and B. Suppose that the reference pixel values extracted for the R image, the G image, and the B image in step S604 are respectively Rs, Gs, and Bs, A(c) is defined by the following equations.

$$A(1)=\Sigma Rs/n$$

$$A(2)=\Sigma Gs/n$$

$$A(3)=\Sigma Bs/n \qquad (3)$$

Here, n denotes the number of the reference pixels in each image. In this step, the reference intensity calculation unit 203 calculates a reference intensity A(c) for each of the color components of R, G, and B by substituting the reference pixel values extracted in step S604 into Equation (3). A reference intensity A(c) does not have to be calculated by using Equation (3), and it may be obtained in any manner as long as it is a parameter representing a difference between intensities of color components of scattered light. For example, it may be obtained by using a weighted average of the reference pixel values of the reference pixels.

In step S606, the reference intensity calculation unit 203 outputs the reference intensity of the scattered light calculated in step S605 to the transmittance calculation unit 205 and the scattered light removal unit 206.

The above is the scattered light reference intensity calculation process performed in this embodiment. According to this process, pixels used for reference intensity calculation are determined on the basis of a dark channel image, and thus pixels in which scattered light is dominant may be obtained accurately. Then, pixel values of the pixels in which the scattered light is dominant are extracted for each color component, and a scattered light removal process is performed, thereby enabling an image in which, of the scattered light, both a component having wavelength dependence and a component having no wavelength dependence are removed to be obtained.

In this embodiment, the acquisition unit 201 functions as an acquisition unit configured to acquire a color image whose pixel values contain components derived from scattered light. The reference intensity calculation unit 203 functions as a derivation unit configured to derive, based on pixel values of a first color component of the color image, a first reference intensity corresponding to the first color component of the scattered light, and derive, based on pixel values of a second color component, which is different from the first color component, of the color image, a second reference intensity, which is different from the first reference intensity, corresponding to the second color component of the scattered light.

The filtering processing unit 204 functions as a filtering unit configured to perform a filtering process in which a pixel value of each pixel in the color image is replaced. The transmittance calculation unit 205 functions as a setting unit configured to set, for each pixel in the color image, weight values representing levels of influences of the scattered light. In addition, the transmittance calculation unit 205 also functions as a weight derivation unit configured to derive a first weight value by using the first reference intensity and derive a second weight value by using the second reference intensity. The scattered light removal unit 206 functions as a generation unit configured to generate a corrected image. The corrected image is an image obtained by correcting a pixel value of the first color component of each pixel in the color image by using the first reference intensity and a weight value, and by correcting a pixel value of the second color component of each pixel in the color image by using the second reference intensity and a weight value.

Second Embodiment

The method according to the first embodiment enables an image in which both a component corresponding to Mie scattering (hereinafter referred to as a Mie scattering component) and a component corresponding to Rayleigh scattering (hereinafter referred to as a Rayleigh scattering component) are removed to be obtained. However, it is known that, in an actual image, even if there is no fog, mist, or the like, scattering due to Rayleigh scattering occurs. That is, when the degree of removal of Rayleigh scattering is kept to such an extent that an intensity of Rayleigh scattering is adjusted, a more natural image will be obtained. Thus, in a second embodiment, a more natural scattered-light-removed image is obtained by adding a Rayleigh scattering component whose intensity is corrected to the image which is obtained in the first embodiment and in which both a Mie scattering component and a Rayleigh scattering component are removed. A Mie scattering component is defined as a pixel value assumed to be caused by scattered light due to Mie scattering among pixel values influenced by scattered light in an input image. A Rayleigh scattering component is defined as a pixel value assumed to be caused by scattered light due to Rayleigh scattering among pixel values influenced by scattered light in an input image.

Figure 8:
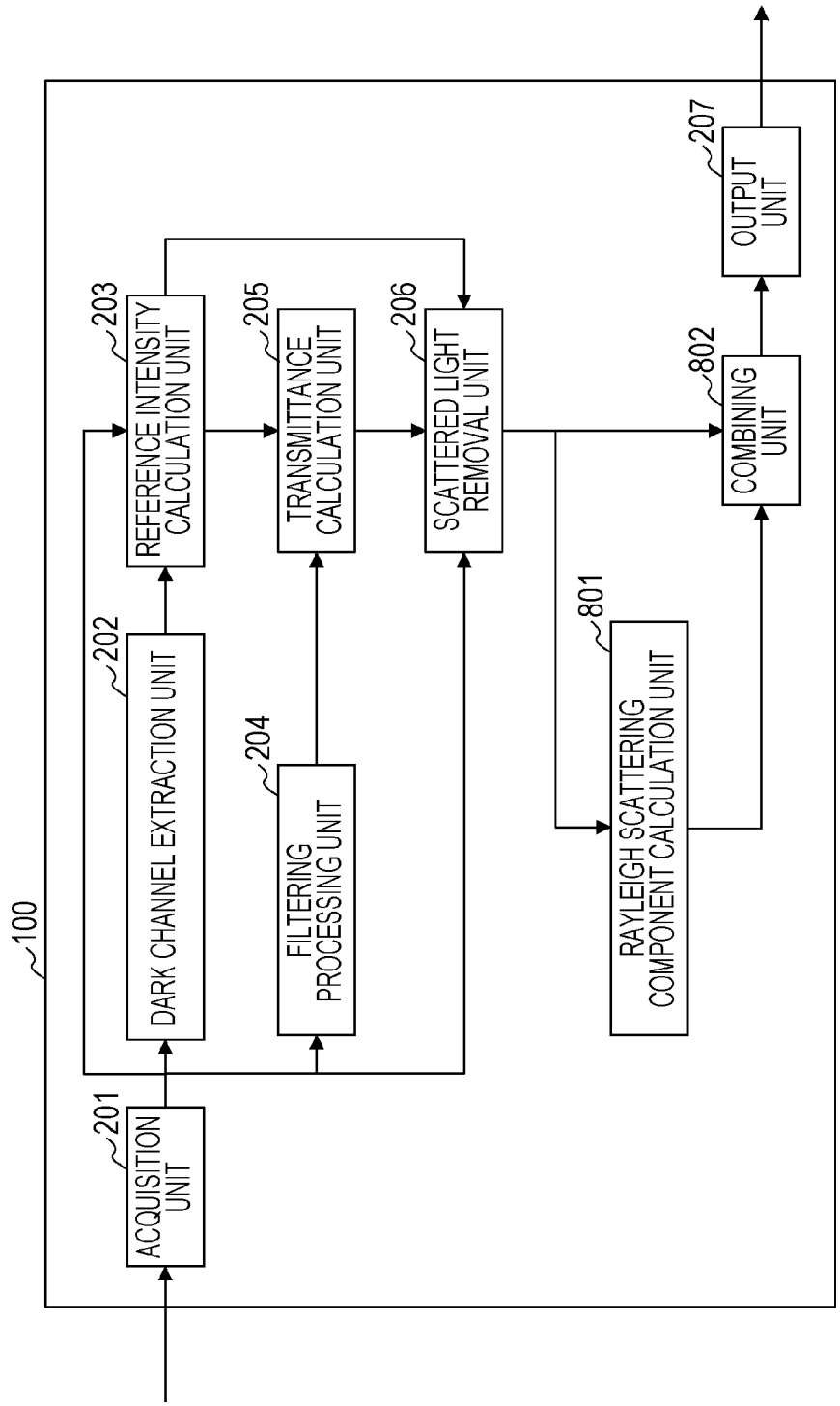
FIG. 8 illustrates the configuration of an image processing apparatus according to a second embodiment.
Figure 9:
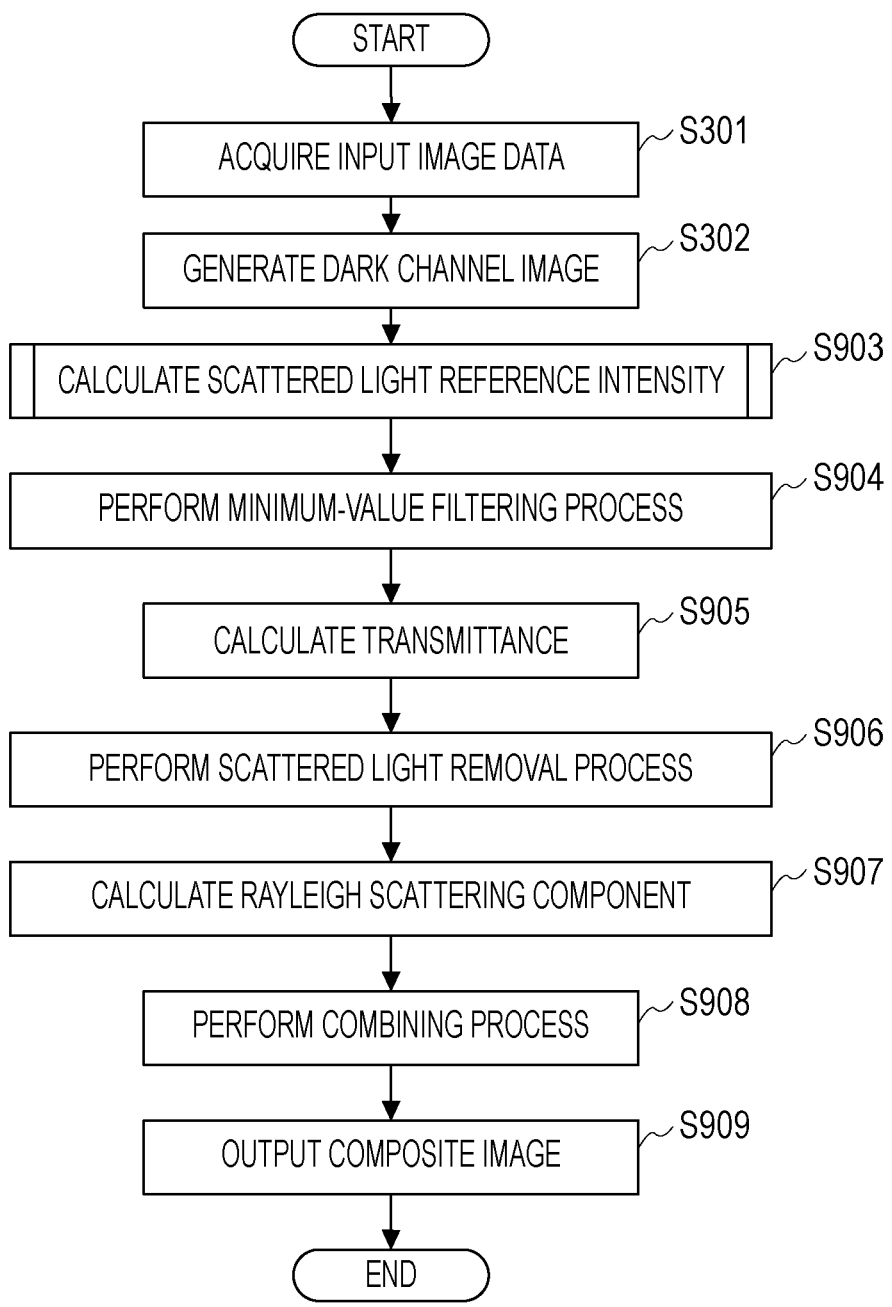
FIG. 9 is a flowchart illustrating the flow of a process performed in the image processing apparatus according to the second embodiment.

A process performed in an image processing apparatus according to this embodiment will be described below with reference to a block diagram illustrated in FIG. 8 and a flowchart illustrated in FIG. 9. FIG. 8 is a processing block diagram of the image processing apparatus 100 in this embodiment. In this embodiment, the CPU 101 executes a program represented by the flowchart in FIG. 9 stored in the ROM 103 or the HDD 105 to thereby function as each block illustrated in FIG. 8. As a matter of course, the CPU 101 does not have to have functions of all the processing blocks, and processing circuits corresponding to the processing blocks may be newly provided in the image processing apparatus 100. The same processes as those in the first embodiment are denoted by the same reference numerals, and description thereof is omitted.

In step S903, as in step S303 in the first embodiment, the reference intensity calculation unit 203 calculates a reference intensity of scattered light. A reference intensity calculation process performed here is basically the same as that performed in step S303; however, in this embodiment, not only a reference intensity A(c) calculated from each of an R image, a G image, and a B image but also a reference intensity $A_{dark}$ calculated from a dark channel image is calculated. Suppose that a pixel value of a reference pixel in the dark channel image is Ds, $A_{dark}$ is defined by the following equation.

$$A_{dark}=\Sigma Ds/n \qquad (4)$$

As in A(c), the reference intensity calculation unit 203 obtains $A_{dark}$ on the basis of Equation (4), and outputs it to the transmittance calculation unit 205 and the scattered light removal unit 206. Because $A_{dark}$ has no wavelength dependence, $A_{dark}$ is a reference intensity of scattered light that reflects a component derived from Mie scattering.

In step S904, the filtering processing unit 204 acquires not only the input image data output from the acquisition unit 201 but also the dark channel image generated by the dark channel extraction unit 202. Then, a minimum-value filtering process is applied to the input image and the dark channel image, and they are output to the transmittance calculation unit 205.

In step S905, the transmittance calculation unit 205 acquires the R, G, and B images and the dark channel image which have been output from the filtering processing unit 204 and which have been subjected to the filtering process, and calculates a transmittance as in step S305. In this step, not only respective transmittances corresponding to the R, G, and B images but also a transmittance $t_{dark}(x, y)$ corresponding to the dark channel image is calculated. The transmittance $t_{dark}(x, y)$ is defined by the following equation.

$$t_{dark}(x, y) = 1.0 - \omega \left( \frac{I_{Fdark}(x, y)}{A_{dark}} \right) \quad (5)$$

Here, $I_{Fdark}(x, y)$ denotes a pixel value of the dark channel image having been subjected to the filtering process. The transmittance calculation unit 205 calculates $t_{dark}(x, y)$ by substituting acquired parameters into Equation (5), and outputs it to the scattered light removal unit 206.

In step S906, the scattered light removal unit 206 performs a scattered light removal process on the input image by using the transmittance output from the transmittance calculation unit 205, the input image data output from the acquisition unit 201, and the reference intensity of the scattered light output from the reference intensity calculation unit 203. In this step, in addition to the scattered light removal process performed in step S306 in the first embodiment, a scattered light removal process using $t_{dark}$ and $A_{dark}$ is also performed. This scattered light removal process is defined by the following equation.

$$J_{dark}(x, y, c) = \frac{(I(x, y, c) - A_{dark})}{\max(t_0, t_{dark}(x, y))} + A_{dark} \quad (6)$$

Here, $J_{dark}(x, y, c)$ denotes a pixel value of an image having been subjected to the scattered light removal process, and $I(x, y, c)$ denotes a pixel value of the input image. $A_{dark}$ and $t_{dark}$ respectively denote the reference intensity of the scattered light and the transmittance that are determined by using the dark channel image. In this scattered light removal process, because a process using parameters common to all the color components of the input image is performed, an image in which only a Mie scattering component having no wavelength dependence is removed is obtained.

The scattered light removal unit 206 outputs, to a Rayleigh scattering component calculation unit 801, both an image obtained by performing the scattered light removal process using A(c) and t, and an image obtained by performing the scattered light removal process using $A_{dark}$ and $t_{dark}$.

In step S907, the Rayleigh scattering component calculation unit 801 extracts a Rayleigh scattering component of the scattered light by using two types of scattered-light-removed images output from the scattered light removal unit 206.

Because $J(x, y, c)$ is a pixel value of the image in which both the Mie scattering component and the Rayleigh scattering component are removed and $J_{dark}(x, y, c)$ is a pixel value of the image in which only the Mie scattering component is removed, suppose that a pixel value corresponding to the Rayleigh scattering component of the scattered light is $K(x, y, c)$, K is defined by the following equation.

$$K(x,y,c) = J_{dark}(x,c) - J(x,y,c) \quad (7)$$

If the value of K is a negative value, the value of K of the pixel is set to 0. The Rayleigh scattering component calculation unit 801 calculates a pixel value $K(x, y, c)$ of the Rayleigh scattering component by substituting pixel values of the images output from the scattered light removal unit 206 into the above equation, and outputs it to a combining unit 802.

In step S908, the combining unit 802 weights and combines $K(x, y, c)$ output from the Rayleigh scattering component calculation unit 801 with $J(x, y, c)$ output from the scattered light removal unit 206 to generate a composite image to be finally output. The combining unit 802 outputs the composite image generated here to the output unit 207. Suppose that a pixel value of the composite image is $L(x, y, c)$, the pixel value L is defined by the following equation.

$$L(x,y,c) = J(x,y,c) + r \cdot K(x,y,c) \quad (8)$$

Here, r is a constant of 0 to 1, and is used for correction of the intensity of the Rayleigh scattering component. In this embodiment, r of 0.5 is used; alternatively, the value of r may be freely adjusted so that a desirable image is obtained.

In step S909, the output unit 207 acquires the composite image output from the combining unit 802, outputs it to the HDD 105 via the HDD I/F 104, and ends the process.

The above is the process according to this embodiment. According to the process, an image in which, of scattered light, a Mie scattering component is removed and a Rayleigh scattering component is corrected in terms of its intensity may be obtained, and thus a more natural image may be obtained.

In this embodiment, the Rayleigh scattering component calculation unit 801 functions as an extraction unit configured to extract a second scattering component of the scattered light by using the corrected image and an image obtained by removing a first scattering component of the scattered light from the color image. Here, the first scattering component is a component having no wavelength dependence, and the second scattering component is a component having wavelength dependence. In addition, the combining unit 802 functions as an addition unit configured to weight and add the extracted second scattering component to the corrected image.

Third Embodiment

In the second embodiment, there has been described a method in which a more natural scattered-light-removed image is obtained by adding a Rayleigh scattering component whose intensity is corrected to an image in which both a Mie scattering component and a Rayleigh scattering component are removed. However, in some places where an image is captured, even in an image captured in clear weather, a small amount of scattering due to Mie scattering may occur. In an image captured in such a place, if the degree of removal of Mie scattering is excessively strong, an unnatural image may be generated. Thus, in a third embodiment, natural scattered-light-removed images appropriate to various scenes are obtained by adding not only a Rayleigh scattering component whose intensity is corrected but also a Mie scattering component whose intensity is corrected to an image in which both a Mie scattering component and a Rayleigh scattering component are removed.

Figure 10:
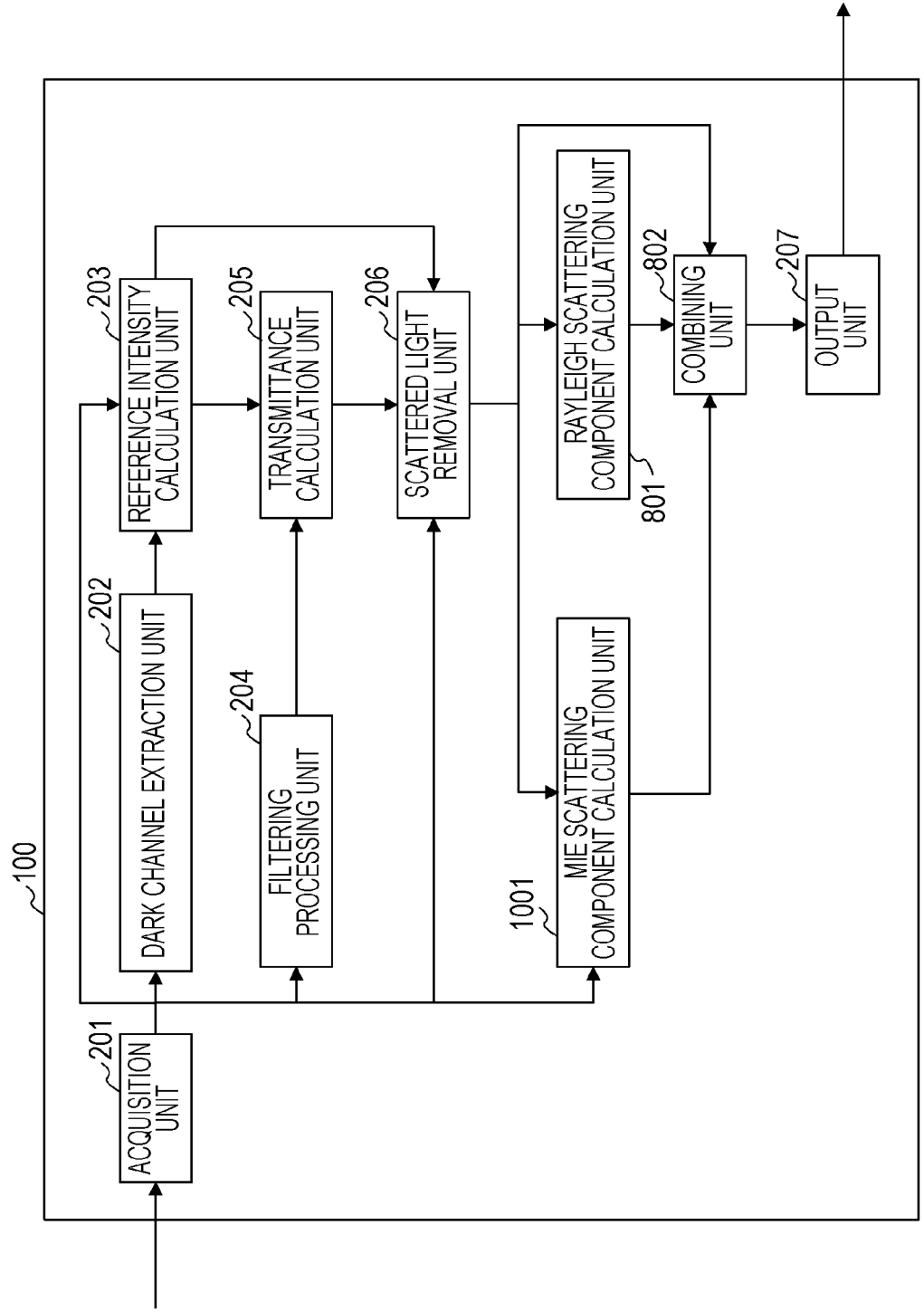
FIG. 10 illustrates the configuration of an image processing apparatus according to a third embodiment.
Figure 11:
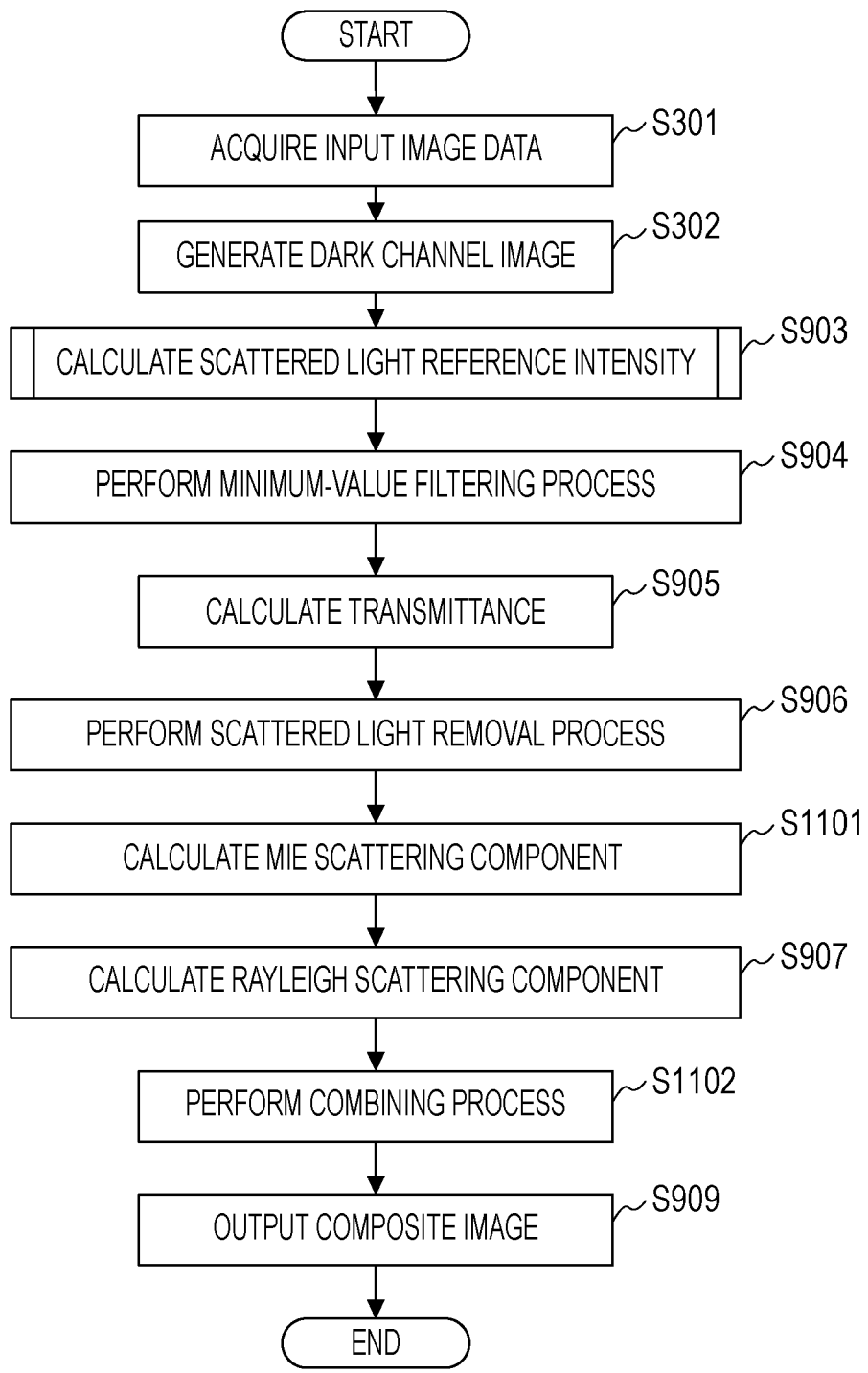
FIG. 11 is a flowchart illustrating the flow of a process performed in the image processing apparatus according to the third embodiment.

A process performed in an image processing apparatus according to this embodiment will be described below with reference to a block diagram illustrated in FIG. 10 and a flowchart illustrated in FIG. 11. FIG. 10 is a processing block diagram of the image processing apparatus 100 in this embodiment. In this embodiment, the CPU 101 executes a program represented by the flowchart in FIG. 11 stored in the ROM 103 or the HDD 105 to thereby function as each block illustrated in FIG. 10. As a matter of course, the CPU 101 does not have to have functions of all the processing blocks, and processing circuits corresponding to the processing blocks may be newly provided in the image processing apparatus 100. The same processes as those in the first and second embodiments are denoted by the same reference numerals, and description thereof is omitted.

In this embodiment, a Mie scattering component calculation process (S1101) is added to the flowchart according to the second embodiment.

In step S1101, a Mie scattering component calculation unit 1001 calculates a Mie scattering component of the scattered light by using a pixel value I(x, y, c) of the input image output from the acquisition unit 201 and a pixel value $J_{dark}$(x, y, c) output from the scattered light removal unit 206. Because I(x, y, c) is a pixel value of the image in which the scattered light is not removed and $J_{dark}$(x, y, c) is a pixel value of the image in which only the Mie scattering component of the scattered light is removed, suppose that a pixel value corresponding to the Mie scattering component of the scattered light is M(x, y, c), M is defined by the following equation.

$$M(x,y,c)=I(x,y,c)-J_{dark}(x,y,c) \quad (9)$$

If the value of M in the above equation is a negative value, the value of M of the pixel is set to 0. The Mie scattering component calculation unit 1001 calculates a pixel value M(x, y, c) of the Mie scattering component by substituting pixel values of the images output from the scattered light removal unit 206 into the above equation, and outputs it to the combining unit 802.

In step S1102, the combining unit 802 acquires J(x, y, c) output from the scattered light removal unit 206, K(x, y, c) output from the Rayleigh scattering component calculation unit 801, and M(x, y, c) output from the Mie scattering component calculation unit 1001. Then, the acquired J(x, y, c), K(x, y, c), and M(x, y, c) are weighted and combined to generate a composite image to be finally output. The combining unit 802 outputs the composite image generated here to the output unit 207. At this time, suppose that a pixel value of the composite image is L(x, y, c), the pixel value L is defined by the following equation.

$$L(x,y,c)=J(x,y,c)+m \cdot M(x,y,c)r \cdot K(x,y,c) \quad (10)$$

Here, m and r are each a constant of 0 to 1, and are used for correction of the intensities of the Mie scattering component and the Rayleigh scattering component. In this embodiment, m of 0.1 and r of 0.5 are used; alternatively, the values of m and r may be freely adjusted so that a desirable image is obtained.

According to the above process, both a Mie scattering component and a Rayleigh scattering component may be freely corrected, and thus natural scattered-light-removed images appropriate to various scenes may be obtained.

Fourth Embodiment

In the first to third embodiments, for each color component of a pixel value, a transmittance in each pixel is calculated by using an image having been subjected to a minimum-value filtering process. The minimum-value filtering process is a process in which, in a patch centered at a target pixel, a plurality of pixels whose color component has been determined to be a dark channel are compared with each other in terms of pixel values of the color component, and a pixel value of the color component of the target pixel is replaced with a minimum pixel value in the patch. However, when a transmittance is obtained through this process, in some cases, a scattered light removal process is susceptible to shot noise or the like occurring during capture of an image.

Thus, in a fourth embodiment, the case where a transmittance is calculated without performing a minimum-value filtering process will be described. Furthermore, in this embodiment, a modification of a method of selecting pixels used for derivation of a scattered light reference intensity will be described.

Figure 12:
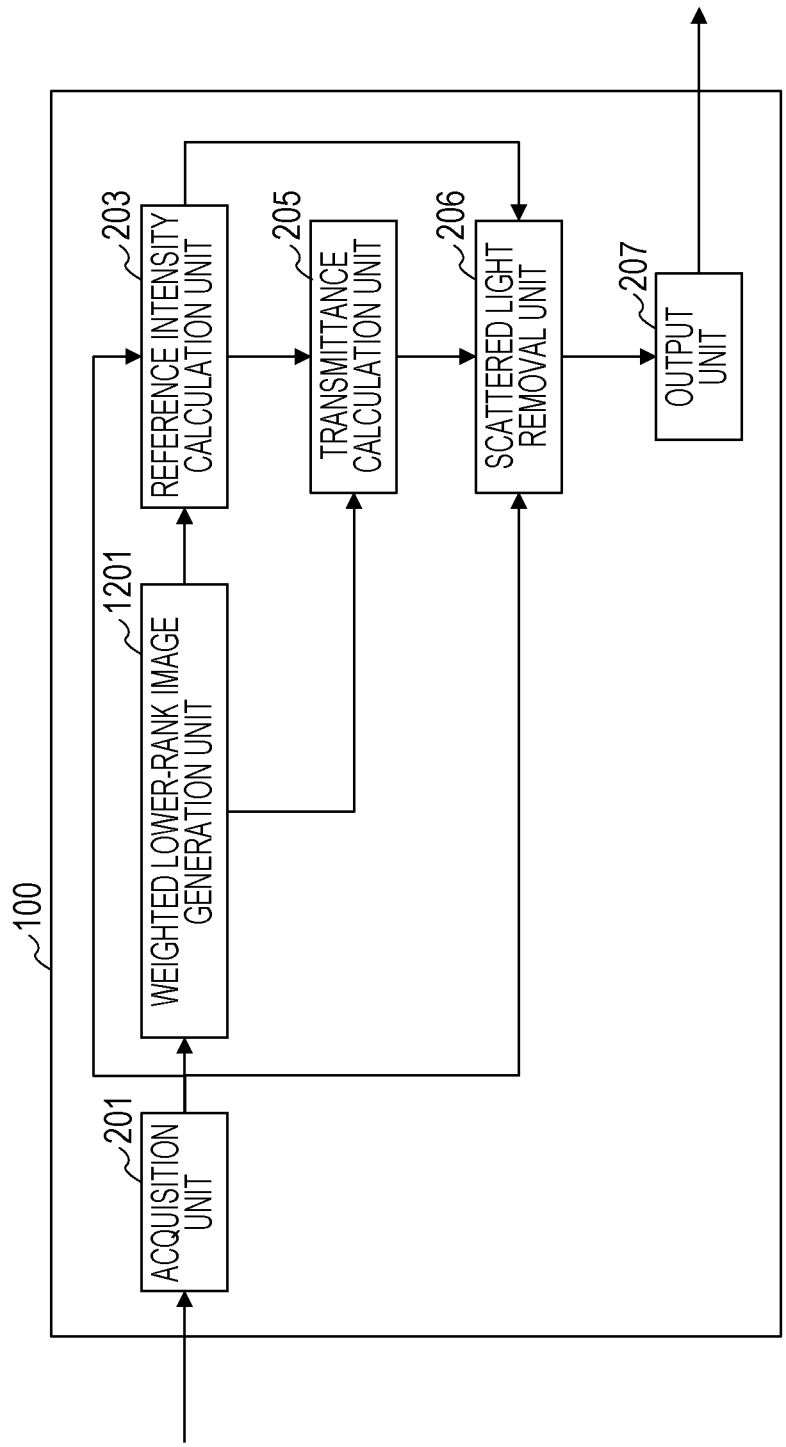
FIG. 12 illustrates the configuration of an image processing apparatus according to a fourth embodiment.
Figure 13:
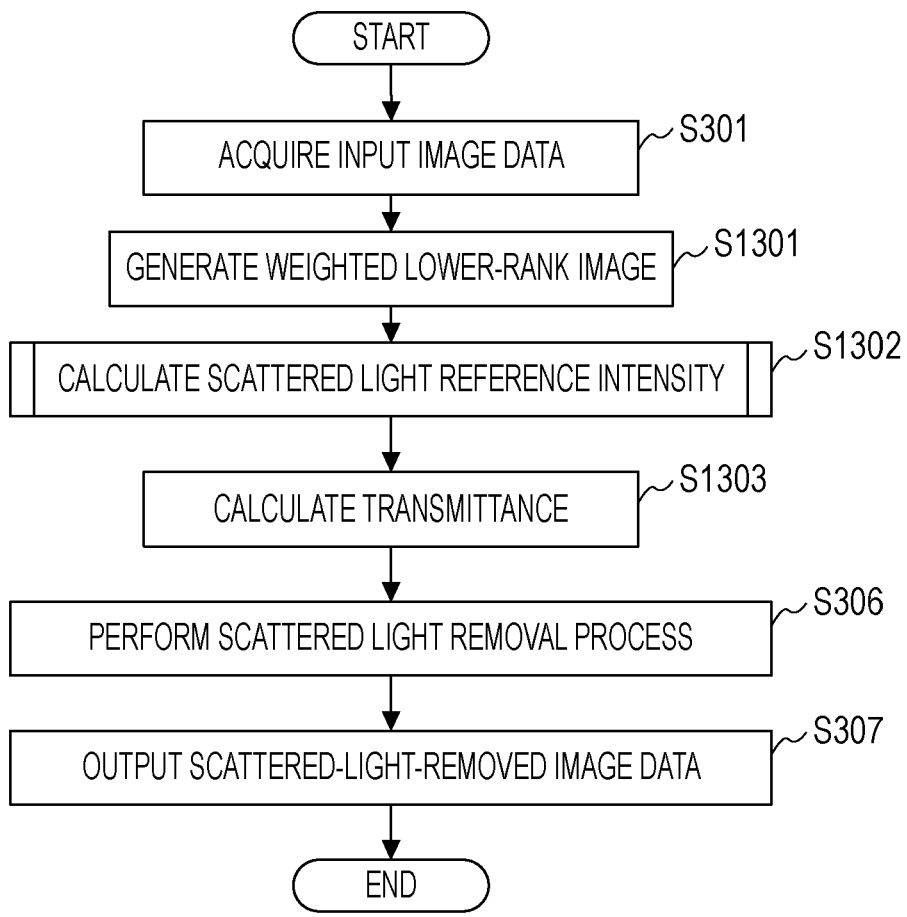
FIG. 13 is a flowchart illustrating the flow of a process performed in the image processing apparatus according to the fourth embodiment.

A process performed in an image processing apparatus according to this embodiment will be described below with reference to a block diagram illustrated in FIG. 12 and a flowchart illustrated in FIG. 13. FIG. 12 is a processing block diagram of the image processing apparatus 100 in this embodiment. In this embodiment, the CPU 101 executes a program represented by the flowchart in FIG. 13 stored in the ROM 103 or the HDD 105 to thereby function as each block illustrated in FIG. 12. As a matter of course, the CPU 101 does not have to have functions of all the processing blocks, and processing circuits corresponding to the processing blocks may be newly provided in the image processing apparatus 100. The same processes as those in the first embodiment are denoted by the same reference numerals, and description thereof is omitted.

In step S1301, a weighted lower-rank image generation unit 1201 generates, for each of R, G, and B color planes, a weighted lower-rank image of the input image by using the input image data output from the acquisition unit 201. The weighted lower-rank image generation unit 1201 outputs the generated weighted lower-rank image to the reference intensity calculation unit 203.

Here, a weighted lower-rank image for each color plane is an image in which a pixel value of a target pixel is replaced with the value of a weighted average of pixel values of a plurality of pixels having the smallest pixel values of the color among the target pixel and a plurality of pixels surrounding the target pixel. When a transmittance is calculated by using this image, the influence of a pixel value, which is a singular value, derived from noise on an image may be suppressed. In addition, in generation of a weighted lower-rank image, if a pixel value of one pixel having the smallest pixel value is not used for generation of a pixel value to be replaced, the influence of noise may be more reduced.

An example of generation of a weighted lower-rank image will be described. For example, in the case of an R plane, suppose that, in 5×5 pixels centered at a target pixel P1, pixels whose pixel values are the smallest in absolute values are U1, U2, and U3, and suppose that respective pixel values are U1(R1), U2(R2), and U3(R3), a pixel value of R of P1 at this time is $(\alpha R1+\beta R2+\gamma R3)/(\alpha+\beta+\gamma)$. Here, $\alpha$, $\beta$, and $\gamma$ are non-negative numbers. Thereafter, this process is applied to all pixels, and a weighted lower-rank image may thereby be generated. Here, calculation for a weighted lower-rank image is performed with reference to 5×5 pixels surrounding the target pixel P1; however, a reference region of pixels used for generation of a weighted lower-rank image is not limited to this, and a larger reference region or smaller reference region may be used. The shape of a reference region may differ in a horizontal to vertical ratio. In particular, in the case where the influence of a scattered light component due to fog, mist, or the like is reduced, because a camera often captures an image so that the upper part of the captured image is occupied by the sky and the lower part is occupied by the ground, a reference region that is long in a horizontal direction may improve the accuracy of calculation.

In step S1302, the reference intensity calculation unit 203 obtains a reference intensity of each color component of the scattered light by using the input image data output from the acquisition unit 201. In the first embodiment, the top 1% of pixels whose pixel values are large among pixels in the dark channel image are defined as reference pixels for a scattered light reference intensity. In this embodiment, the reference intensity calculation unit 203 converts pixel values of pixels in the input image data into luminance values, and pixels corresponding to the top 1% of the magnitudes of the luminance values are defined as reference pixels used for reference intensity calculation. Processes other than the process of selecting reference pixels are similar to those in the first embodiment, and description thereof is omitted. The reference intensity calculation unit 203 outputs the calculated scattered light reference intensity to the transmittance calculation unit 205.

In step S1303, the transmittance calculation unit 205 determines, on the basis of the weighted lower-rank image output from the weighted lower-rank image generation unit 1201 and the scattered light reference intensity output from the reference intensity calculation unit 203, a transmittance t(x, y, c) at each pixel position of the input image. The transmittance t(x, y, c) is defined by the following equation.

$$t(x, y, c) = 1.0 - \omega\left(\frac{I_w(x, y, c)}{A(c)}\right) \quad (11)$$

Here, $I_w(x, y, c)$ denotes a pixel value of the weighted lower-rank image. The definitions of the other parameters are the same as those in Equation (1). The transmittance calculation unit 205 outputs the calculated transmittance to the scattered light removal unit 206, and the processes in step S306 and the subsequent step are performed.

The above is the process performed in the image processing apparatus according to this embodiment. According to the process, the influence of noise in an input image on a final image may be suppressed.

Other Embodiments

The embodiments of the present invention is not limited thereto. For example, the case where each pixel has pixel values of three colors of R, G, and B has been considered in the above embodiments; however, the present invention may also be applied to, for example, the case where each pixel has pixel values of other colors, such as cyan, yellow, and magenta. In addition, the present invention may be applied to the case where each color component is represented by not only a direct output from each pixel value but also a linear combination of luminance and color differences, such as Y, U, and V.

Furthermore, as for $J_{dark}$, a dark channel image or the like does not have to be used, and a weighted average based on results in R, G, and B planes may be applied.

Although pixels used for calculation of a scattered light reference intensity are determined by using a dark channel image in the above embodiments, calculation of a scattered light reference intensity does not necessarily have to be performed by using this method. For example, a user may select a region containing pixels to be used as reference pixels on a screen, or alternatively, pixels corresponding to a region which exists in the upper part of an image and has a certain amount of area, and in which contrast is low may be automatically selected as reference pixels.

Furthermore, in the above embodiments, an intensity of scattered light at each pixel position is determined by multiplying a scattered light reference intensity by a transmittance; alternatively, a weight value, which is not a transmittance, may be used as long as a similar result is obtained by using it. For example, another parameter dependent on a subject distance may be used as a weight value.

Furthermore, in the above embodiments, a transmittance is calculated by using an equation dependent on a scattered light reference intensity; alternatively, any method may be employed as long as each parameter is obtained by using it. For example, a mapping table of a scattered light reference intensity and a transmittance may be prepared, and a transmittance may be determined on the basis of the mapping table. Also, a subject distance may be estimated from an image captured in clear weather or map information, and a transmittance of each pixel may be calculated on the basis of the estimated subject distance. Alternatively, a transmittance map calculated externally in advance may be acquired to be used for a scattered light removal process.

The present invention may be embodied as, for example, a system, device, method, program, storage medium, or the like. Also, the present invention may be applied to a system including a plurality of devices, or may be applied to an apparatus composed of a single device.

The present invention may also be implemented by supplying a storage medium storing program codes of software that implements functions of the above embodiments (for example, processes represented by the above flowcharts) to a system or apparatus. In this case, the functions of the above embodiments are implemented by a computer (CPU or micro processing unit (MPU)) of the system or apparatus reading out and executing the program codes computer-readably stored in the storage medium. Furthermore, the program may be executed by a single computer or by a plurality of computers working together.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-245199 filed Nov. 27, 2013, which is hereby incorporated by reference herein in its entirety.

What is claimed is:

1. An image processing apparatus that generates a corrected image obtained by removing, from a color image whose pixel values contain components derived from scattered light, at least part of the components derived from the scattered light, the image processing apparatus comprising:
a memory for storing a computer program;
a processor coupled to the memory for executing the computer program, the computer program causing the processor to:
acquire the color image;
derive, based on pixel values of a first color component of the color image, a first reference intensity corresponding to the first color component of the scattered light, and derive, based on pixel values of a second color component, which is different from the first color component, of the color image, a second reference intensity, which is different from the first reference intensity, corresponding to the second color component of the scattered light;
set, for each pixel in the color image, weight values representing levels of influences of the scattered light;
perform a filtering process in which at least one pixel value of each pixel in the color image is replaced; and
generate the corrected image by correcting a pixel value of the first color component of each pixel in the color image by using the first reference intensity and a weight value, and by correcting a pixel value of the second color component of each pixel in the color image by using the second reference intensity and a weight value,
wherein the filtering process is a process in which a pixel value of the first color component of a pixel to be subjected to the filtering process is replaced with a minimum pixel value among pixel values of the first color component of a plurality of pixels including the pixel to be subjected to the filtering process, and a pixel value of the second color component of a pixel to be subjected to the filtering process is further replaced with a minimum pixel value among pixel values of the second color component of a plurality of pixels including the pixel to be subjected to the filtering process.

2. The image processing apparatus according to claim 1, wherein, for each pixel in the color image, the processor sets a first weight value for the first color component, and sets a second weight value for the second color component, and
wherein the processor generates the corrected image by correcting the pixel value of the first color component of each pixel in the color image by using the first reference intensity and the first weight value, and by correcting the pixel value of the second color component of each pixel in the color image by using the second reference intensity and the second weight value.

3. The image processing apparatus according to claim 2, wherein the processor further operates to derive the first weight value by using the first reference intensity and derive the second weight value by using the second reference intensity.

4. The image processing apparatus according to claim 3, wherein the processor derives the first weight value and the second weight value by using an image having been subjected to the filtering process.

5. The image processing apparatus according to claim 2, wherein the first weight value and the second weight value are each a transmittance of light.

6. The image processing apparatus according to claim 1, wherein each pixel in the color image has a plurality of pixel values corresponding to a plurality of color components, and
wherein the processor selects, among pixels in the color image, a pixel whose minimum pixel value among the plurality of pixel values is larger than or equal to a threshold, as a pixel used for derivation of a reference intensity of the scattered light.

7. The image processing apparatus according to claim 1, wherein the corrected image is an image in which, of the influences of the scattered light in the color image, an influence of a first scattering component having no wavelength dependence and an influence of a second scattering component having wavelength dependence are reduced.

8. The image processing apparatus according to claim 7, wherein the first scattering component is a component corresponding to Mie scattering.

9. The image processing apparatus according to claim 7, wherein the second scattering component is a component corresponding to Rayleigh scattering.

10. The image processing apparatus according to claim 7, wherein the processor further operates to extract the second scattering component of the scattered light by using the corrected image and an image obtained by removing the first scattering component of the scattered light from the color image.

11. The image processing apparatus according to claim 10, wherein the processor further operates to weight and add the extracted second scattering component to the corrected image.

12. The image processing apparatus according to claim 11, wherein the processor further weights and adds the first scattering component extracted from the color image to the corrected image.

13. The image processing apparatus according to claim 12, wherein the first scattering component is a component extracted by using the color image and an image obtained by removing the first scattering component from the color image.

14. The image processing apparatus according to claim 1, wherein the processor further derives a luminance value of each pixel in the color image, and selects, based on the derived luminance value, a pixel used for derivation of the first reference intensity and the second reference intensity.

15. The image processing apparatus according to claim 14, wherein the processor selects, as a candidate of a pixel used for derivation of the first reference intensity and the second reference intensity, a pixel whose luminance value is larger than or equal to a predetermined threshold.

16. The image processing apparatus according to claim 3, wherein the color image includes one or more image regions each containing a plurality of pixels in the color image, and the processor sets the weight values for each image region of the one or more image regions each containing a plurality of pixels in the color image, and wherein, for at least one image region of the one or more image regions, the processor determines the first weight value based on pixel values of a plurality of pixels having smallest pixel values of the first color component among pixels included in the at least one image region from which at least a pixel having a smallest pixel value of the first color component among the pixels included in the at least one image region is excluded, and determines the second weight value based on pixel values of a plurality of pixels having smallest pixel values of the second color component among pixels included in the at least one image region from which at least a pixel having a smallest pixel value of the second color component among the pixels included in the at least one image region is excluded.

17. An image processing apparatus comprising:

a memory for storing a computer program;

a processor coupled to the memory for executing the computer program, the computer program causing the processor to:

acquire image data representing a color image whose pixel values contain components derived from scattered light;

perform a filtering process in which at least one pixel value of each pixel in the color image is replaced; and correct at least one pixel value of each pixel in the color image to reduce an influence of the scattered light in the color image, wherein the processor makes different corrections to respective different color components of the at least one pixel value of each pixel in the color image, and wherein the filtering process is a process in which a pixel value of a first color component of a pixel to be subjected to the filtering process is replaced with a minimum pixel value among pixel values of the first color component of a plurality of pixels including the pixel to be subjected to the filtering process, and a pixel value of a second color component of a pixel to be subjected to the filtering process is further replaced with a minimum pixel value among pixel values of the second color component of a plurality of pixels including the pixel to be subjected to the filtering process.

18. The image processing apparatus according to claim 17, wherein the at least one pixel value of each pixel comprises pixel values, and the processor makes corrections, based on different parameters, to the pixel values corresponding to the respective different color components in each pixel having the pixel values to be corrected.

19. An image processing method in which a corrected image is generated, the corrected image being obtained by removing, from a color image whose pixel values contain components derived from scattered light, at least part of the components derived from the scattered light, the image processing method comprising:

acquiring the color image;

deriving, based on pixel values of a first color component of the color image, a first reference intensity corresponding to the first color component of the scattered light;

deriving, based on pixel values of a second color component, which is different from the first color component, of the color image, a second reference intensity, which is different from the first reference intensity, corresponding to the second color component of the scattered light;

setting, for each pixel in the color image, weight values representing levels of influences of the scattered light;

performing a filtering process in which at least one pixel value of each pixel in the color image is replaced; and generating the corrected image by correcting a pixel value of the first color component of each pixel in the color image by using the first reference intensity and a weight value, and by correcting a pixel value of the second color component of each pixel in the color image by using the second reference intensity and a weight value, wherein the filtering process is a process in which a pixel value of the first color component of a pixel to be subjected to the filtering process is replaced with a minimum pixel value among pixel values of the first color component of a plurality of pixels including the pixel to be subjected to the filtering process, and a pixel value of the second color component of a pixel to be subjected to the filtering process is further replaced with a minimum pixel value among pixel values of the second color component of a plurality of pixels including the pixel to be subjected to the filtering process.

20. An image processing method comprising:

acquiring image data representing a color image whose pixel values contain components derived from scattered light;

performing a filtering process in which at least one pixel value of each pixel in the color image is replaced; and correcting at least one pixel value of each pixel in the color image to reduce an influence of the scattered light in the color image, wherein, in the correcting, different corrections are made to respective different color components of the at least one pixel value of each pixel in the color image, and wherein the filtering process is a process in which a pixel value of a first color component of a pixel to be subjected to the filtering process is replaced with a minimum pixel value among pixel values of the first color component of a plurality of pixels including the pixel to be subjected to the filtering process, and a pixel value of a second color component of a pixel to be subjected to the filtering process is further replaced with a minimum pixel value among pixel values of the second color component of a plurality of pixels including the pixel to be subjected to the filtering process.

21. A non-transitory storage medium storing a program for causing a computer to execute the method according to claim 19.

22. A non-transitory storage medium storing a program for causing a computer to execute the method according to claim 20.

23. The image processing apparatus according to claim 1, wherein the corrected pixel value of the first color component is different from, or exists separately from or in addition to, the corrected pixel value of the second color component.

24. The image processing method according to claim 19, wherein the corrected pixel value of the first color component is different from, or exists separately from or in addition to, the corrected pixel value of the second color component.

25. The image processing apparatus according to claim 1, wherein the processor further operates to determine reference pixels and extract reference pixel values for the first color component and the second color component of the reference pixels to be used as the pixel values for deriving the first reference intensity and the second reference intensity.

26. The image processing method according to claim 19, further comprising determining reference pixels and extracting reference pixel values for the first color component and the second color component of the reference pixels to be used as the pixel values for deriving the first reference intensity and the second reference intensity.

27. An image processing apparatus that generates a corrected image obtained by removing, from a color image whose pixel values contain components derived from scattered light, at least part of the components derived from the scattered light, the image processing apparatus comprising:
   an acquisition circuit configured to acquire the color image;
   a derivation circuit configured to derive, based on pixel values of a first color component of the color image, a first reference intensity corresponding to the first color component of the scattered light, and derive, based on pixel values of a second color component, which is different from the first color component, of the color image, a second reference intensity, which is different from the first reference intensity, corresponding to the second color component of the scattered light;
   a setting circuit configured to set, for each pixel in the color image, weight values representing levels of influences of the scattered light;
   a filtering circuit configured to perform a filtering process in which at least one pixel value of each pixel in the color image is replaced; and
   a generation circuit configured to generate the corrected image by correcting a pixel value of the first color component of each pixel in the color image by using the first reference intensity and a weight value, and by correcting a pixel value of the second color component of each pixel in the color image by using the second reference intensity and a weight value,
   wherein the filtering process is a process in which a pixel value of the first color component of a pixel to be subjected to the filtering process is replaced with a minimum pixel value among pixel values of the first color component of a plurality of pixels including the pixel to be subjected to the filtering process, and a pixel value of the second color component of a pixel to be subjected to the filtering process is further replaced with a minimum pixel value among pixel values of the second color component of a plurality of pixels including the pixel to be subjected to the filtering process.

28. The image processing apparatus according to claim 27,
   wherein, for each pixel in the color image, the setting circuit sets a first weight value for the first color component, and sets a second weight value for the second color component, and
   wherein the generation circuit generates the corrected image by correcting the pixel value of the first color component of each pixel in the color image by using the first reference intensity and the first weight value, and by correcting the pixel value of the second color component of each pixel in the color image by using the second reference intensity and the second weight value.

29. The image processing apparatus according to claim 28, further comprising
   a weight derivation circuit configured to derive the first weight value by using the first reference intensity and derive the second weight value by using the second reference intensity.

30. The image processing apparatus according to claim 29, wherein the weight derivation circuit derives the first weight value and the second weight value by using an image having been subjected to the filtering process.

31. The image processing apparatus according to claim 28,
   wherein each of the first weight value and the second weight value is a transmittance of light.

32. The image processing apparatus according to claim 27, wherein each pixel in the color image has a plurality of pixel values corresponding to a plurality of color components, and
   wherein the derivation circuit selects, among pixels in the color image, a pixel whose minimum pixel value among the plurality of pixel values is larger than or equal to a threshold, as a pixel used for derivation of a reference intensity of the scattered light.

33. The image processing apparatus according to claim 27,
   wherein the corrected image is an image in which, of the influences of the scattered light in the color image, an influence of a first scattering component having no wavelength dependence and an influence of a second scattering component having wavelength dependence are reduced.

* * * * *